United States Patent [19]

Amborn et al.

[11] Patent Number: 5,194,058
[45] Date of Patent: Mar. 16, 1993

[54] DIFFERENTIAL DRIVE

[75] Inventors: Peter Amborn, Neunkirchen;
Wolfgang Hildebrandt, Lohmar;
Klaus Greulich, Hollig, all of Fed.
Rep. of Germany

[73] Assignee: Viscodrive GMBH, Lohmar, Fed. Rep. of Germany

[21] Appl. No.: 897,367

[22] Filed: Jun. 11, 1992

[30] Foreign Application Priority Data

Jun. 12, 1991 [DE] Fed. Rep. of Germany ....... 4119314

[51] Int. Cl.$^5$ .......................... F16H 1/36; F16H 1/45; F16H 55/17
[52] U.S. Cl. .................................. 475/344; 475/226; 475/249; 475/252; 475/346
[58] Field of Search ................... 74/650; 475/220, 226, 475/227, 248, 249, 251, 252, 331, 344, 346

[56] References Cited

U.S. PATENT DOCUMENTS

| | | | |
|---|---|---|---|
| 1,499,763 | 7/1924 | Davis | 475/344 X |
| 2,288,206 | 6/1942 | Peerpont | 475/344 X |
| 2,382,846 | 8/1945 | Barber | 475/346 X |
| 3,343,429 | 9/1967 | Frost | 475/226 |
| 4,106,366 | 8/1978 | Altenbokum et al. | 475/344 |
| 4,942,781 | 7/1990 | Hori | 475/344 |
| 5,055,096 | 10/1991 | Riemscheid et al. | 475/252 X |
| 5,108,353 | 4/1992 | Brewer et al. | 475/227 |
| 5,122,102 | 6/1992 | Chludek et al. | 475/252 |

FOREIGN PATENT DOCUMENTS

| | | | |
|---|---|---|---|
| 356401 | 2/1990 | European Pat. Off. | 475/248 |
| 811650 | 8/1951 | Fed. Rep. of Germany | 475/252 |

*Primary Examiner*—Leslie A. Braun
*Assistant Examiner*—David E. Henn
*Attorney, Agent, or Firm*—Harness, Dickey & Pierce

[57] ABSTRACT

A differential drive has a differential carrier rotatably supported in a differential housing. Two axle shaft gears are rotatably held in cylindrical bores in the differential carrier and are arranged coaxially relative to each other. Several differential gears, in an axis-parallel arrangement, are supported in an axle-free way in bores in the differential carrier. One group of differential gears engages one of the axle shaft gears and another group engages the other axle shaft gear. At least one group of the differential gears engages the other group of differential gears. The axle shaft gears or differential gears radially deviate from a complete symmetry so that at least periodically there occurs a friction contact between the axle shaft gears and their cylindrical bore in the differential carrier.

3 Claims, 7 Drawing Sheets

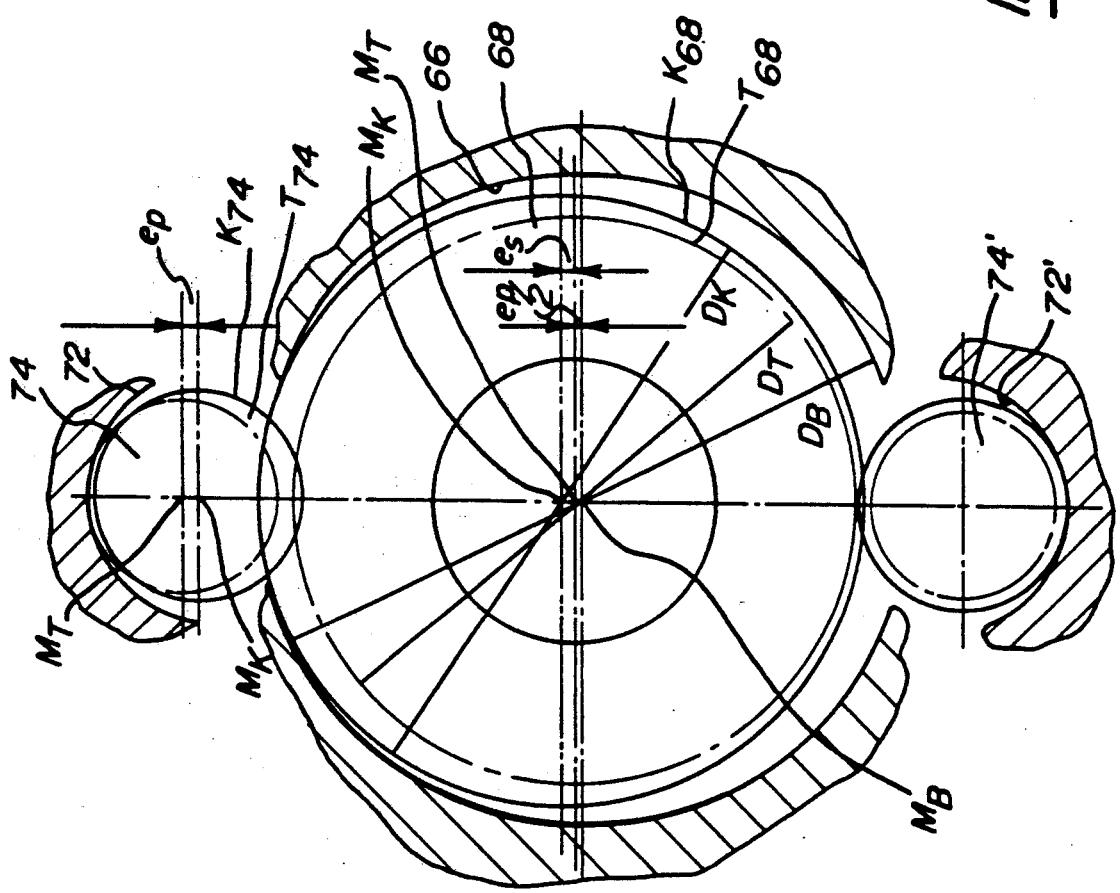

DIFFERENTIAL DRIVE

BACKGROUND OF THE INVENTION

The invention relates to a differential drive having a differential carrier rotatably supported in a differential housing. Two axle shaft gears are rotatably held in cylindrical bores in the differential carrier and arranged coaxially relative to each other. A plurality of differential gears are in an axis-parallel arrangement supported in an axle-free way in bores in the differential carrier. One group of the differential gears engages one of the axle shaft gears, while another group of the differential gears engages the other axle shaft gear. The gears of the one group of the differential gears engages at least one of the gears of the other group of differential gears, respectively.

In differential drives with differential gears supported on their tooth tips in the housing bores, a self-inhibiting effect is present as a result of the friction forces occurring at the differential gears. The friction forces are caused by radial component tooth forces which occur at the differential gears. If the differential gears are uniformly distributed about the axle shaft gear circumference, the axle shaft gears are substantially centered between the differential gears. As a result of the centering, circumferential play is present circumferentially at the tooth tips of the differential gears relative to their cylindrical bores so that the desirable friction forces are generated exclusively at the tip heads of the differential gears if the friction conditions are disregarded at the end faces.

Based on the above, it has been proposed to distribute the differential gears unevenly around the axle shaft gear circumference. This distribution generates a considerable high radial force as a result of the tooth forces acting on the axle shaft gears. The objective is to achieve a substantial increase in the locking effect of the differential drive due to the friction between the tooth tips of the axle shaft gears and their cylindrical bores in the differential carrier. This design has certain disadvantages. For example, in respect of the balance of masses and the necessary reduction of differential gears, one disadvantage is in the reduced number of differential gears as compared to the maximum possible number of gears from a construction point of view.

SUMMARY OF THE INVENTION

It is the object of the present invention to provide a differential drive which enables a higher locking effect without introducing additional expensive design measures, wherein the locking effect occurs independently of the circumferential distribution of the differential gears relative to the axle shaft gears, even if the differential gears are distributed symmetrically.

In accordance with the invention, the objective is achieved with $e_s$ for the maximal deviation in an axle shaft gear and $e_P$ for the maximal deviation in a differential gear, respectively, between addendum circle center point $M_K$ and pitch circle center point $M_T$, then $(D_B - D_K) < 2e_S + e_P$ applies, wherein $D_B$ is the bore diameter of the axle shaft gear and $D_K$ the addendum circle diameter of the axle shaft gear. Hereby either $e_P$ or $e_s$ can also be nil without affecting the correctness of the condition.

A friction contact occurs at least periodically between the at least one axle shaft gear and its cylindrical bore in the differential carrier as a function of the position of tooth engagement, i.e. in the case of differential movements between the two axle shaft gears.

These design measures ensure that the axle shaft gears in accordance with the invention are not centered in their cylinder bores and are not held with play relative to their cylindrical bores by the differential gears. However, whenever a differential movement occurs, i.e. a relative rotation of the axle shaft gears in the differential carrier, a friction-generating sliding movement occurs at the tooth tips of the axle shaft gears in their bores. In this way, the locking effect of the differential drive is increased considerably.

In a first embodiment, the measures in accordance with the invention are put into effect in that the connecting line of the centers of the local pitch circle diameters of the teeth at the axle shaft gears and differential gears having said radial deviation constitutes a curved line.

According to a second embodiment, the connecting line of the centers of the local pitch circle diameters of the teeth at the axle shaft gears and differential gears having the radial deviation extends parallel to the straight connecting line between the centers of the two end addendum circle diameters of the teeth.

Both measures have to be combined with the step of selecting a suitable bore diameter for the axle shaft gears. The first measure mentioned above substantially means that the respective gears have to be regarded as being non-axially symmetric, e.g. having a curvature. Such a shape may be obtained for example by carrying out special heat treatment measures.

The second solution essentially means that the axis of the centers of the addendum circle and the axis of the centers of the pitch circle of the respective gears are of the pitch circle of the respective gears are offset relative to each other so that, if viewed in cross section, the gears are asymmetric. This may be achieved, for example, by clamping in the gears eccentrically for grinding purposes as compared to the way of clamping them in for milling purposes. Furthermore, both measures may be combined. Ordinarily, the axle shaft gears and differential gears will have the same size, respectively, i.e. they are used in a differential featuring a uniform torque distribution. This means that the conditions in accordance with the invention may apply to both axle shaft gears. However, the gears may also be used in a differential featuring an uneven torque distribution, i.e. the axle shaft gears have different sizes. The conditions will then apply to at least one of the axle shaft gears.

From the following detailed description taken in conjunction with the accompanying drawings and subjoined claims, other objects and advantages of the present invention will become apparent to those skilled in the art.

BRIEF DESCRIPTION OF THE DRAWINGS

FIG. 8 is a schematic view like FIG. 4 of a gear arrangement in accordance with a third embodiment in an extreme position.

DETAILED DESCRIPTION OF THE PREFERRED EMBODIMENTS

Figure 1A:
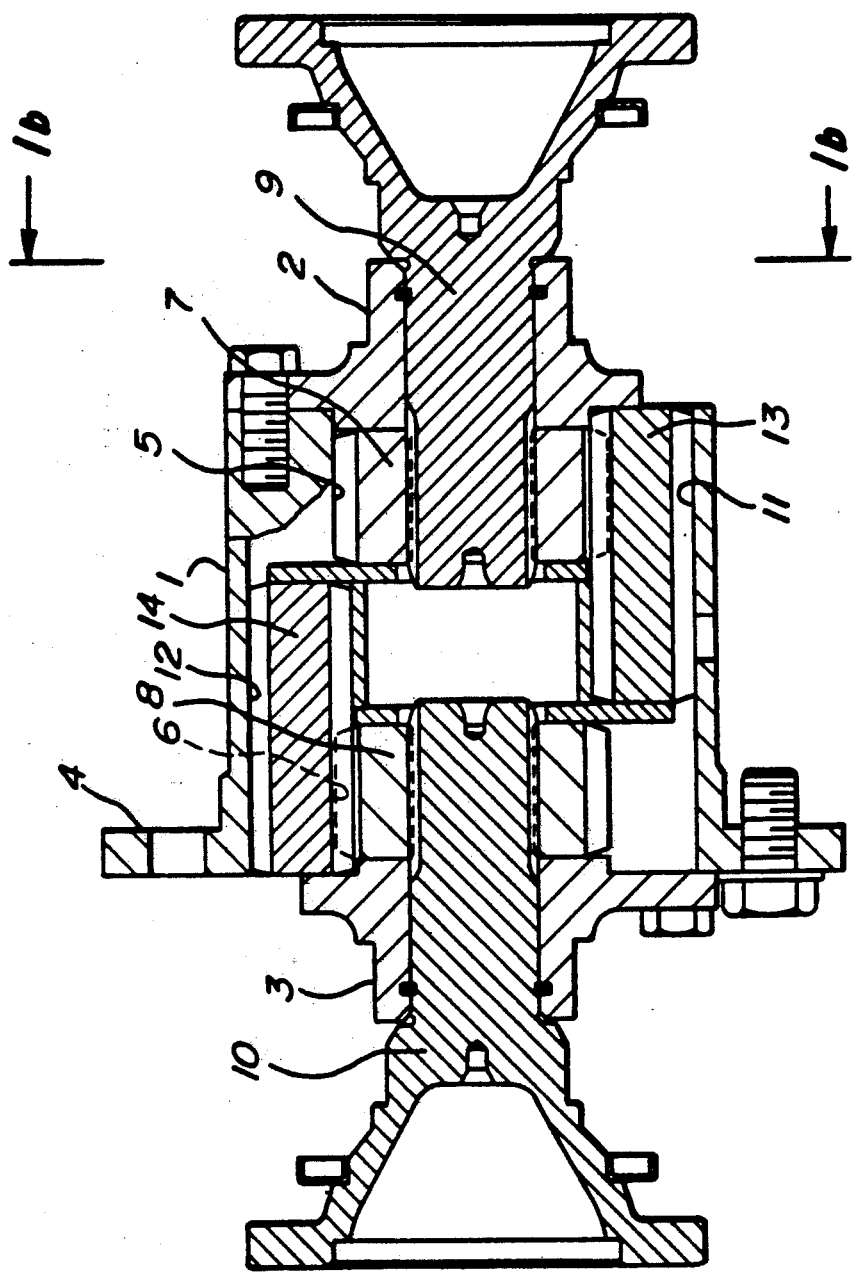
FIG. 1a is a longitudinal cross section view of an axial differential with even torque distribution without the drive housing, whereto the invention may be applied.

A differential carrier 1 includes mounting seats 2, 3 upon which roller bearing (not shown) can be mounted. The differential carrier 1 is rotatably mounted in a drive housing (not shown). The carrier 1 has a flange 4 on one side where a drive pinion may be fastened. Coaxial bores or pockets 5, 6 are in the differential carrier. Two axle shaft gears 7, 8 are mounted coaxially to each other with radial play in their respective bores. These gears, are non-rotatingly bound to axle shafts 8, 9 which protrude from the differential carrier. Further, two groups of bores 11, 12 are in the differential carrier, which penetrate each other at least as pairs. Differential gears 13, 14 which slide on their tooth heads are mounted in these bores 11, 12. The bores or pockets 11, 12 penetrate the respective bores 5, 6 so that the differential gears 13 mesh with the axle shaft gear 7 and the differential gears 14 mesh with the axle shaft gear 8. As can be seen in cross section, gear engagement is provided between the two respective differential gears 13, 14 in an axial middle portion between the axle shaft gears. Due to the rotational symmetrical distribution of the differential gear around the axle shaft gears, the axle shaft gears are centralized and held with clearance in the housing bores 5, 6, according to the state of the art.

Figure 1B:
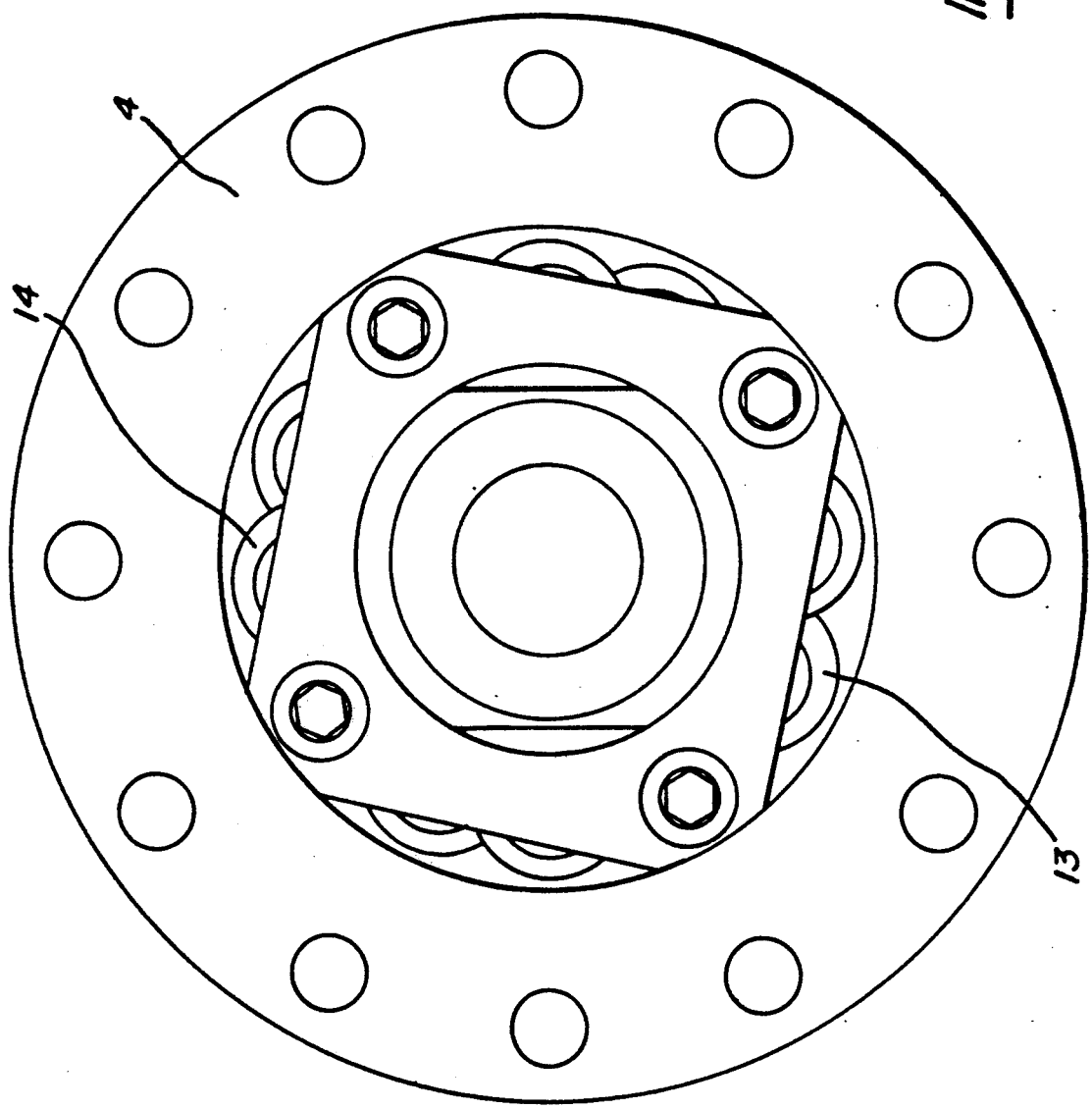
FIG. 1b is a section view of FIG. 1a along 1b—1b.
Figure 2:
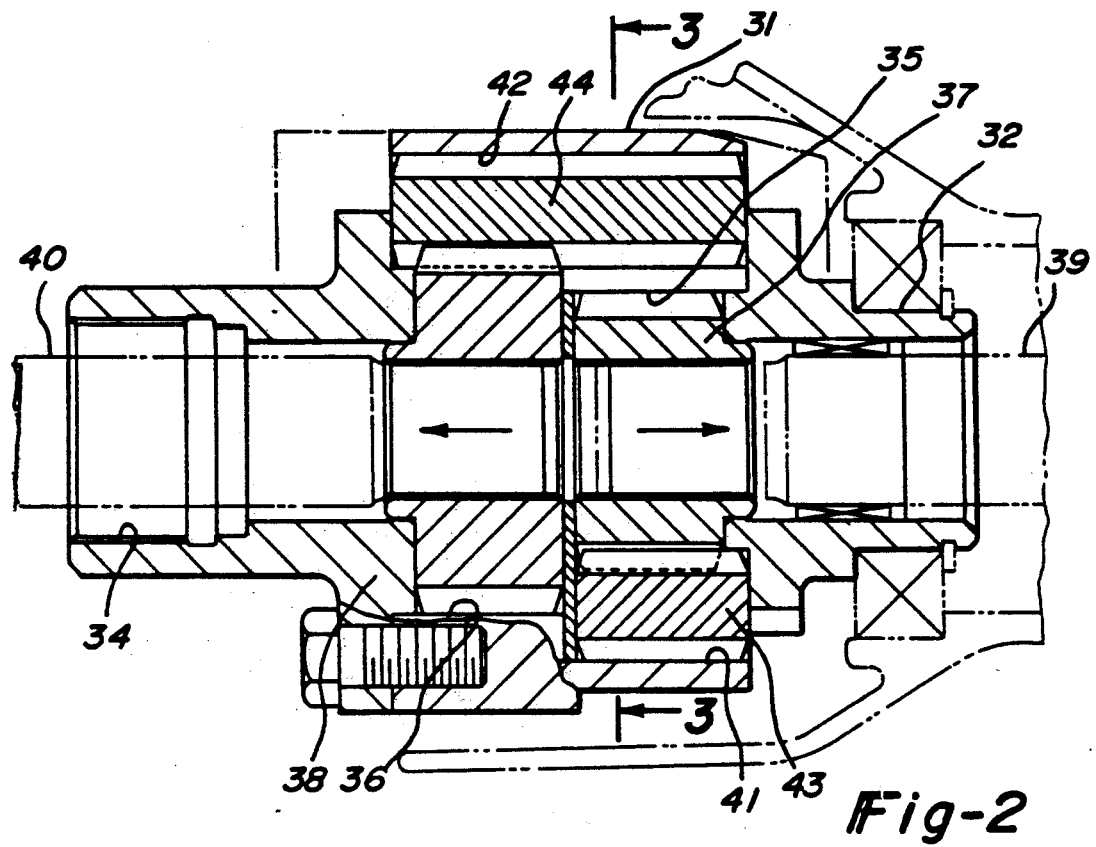
FIG. 2 is a longitudinal cross section view of a middle differential with uneven torque distribution with the drive housing shown in phantom in accordance with the invention.
Figure 3:
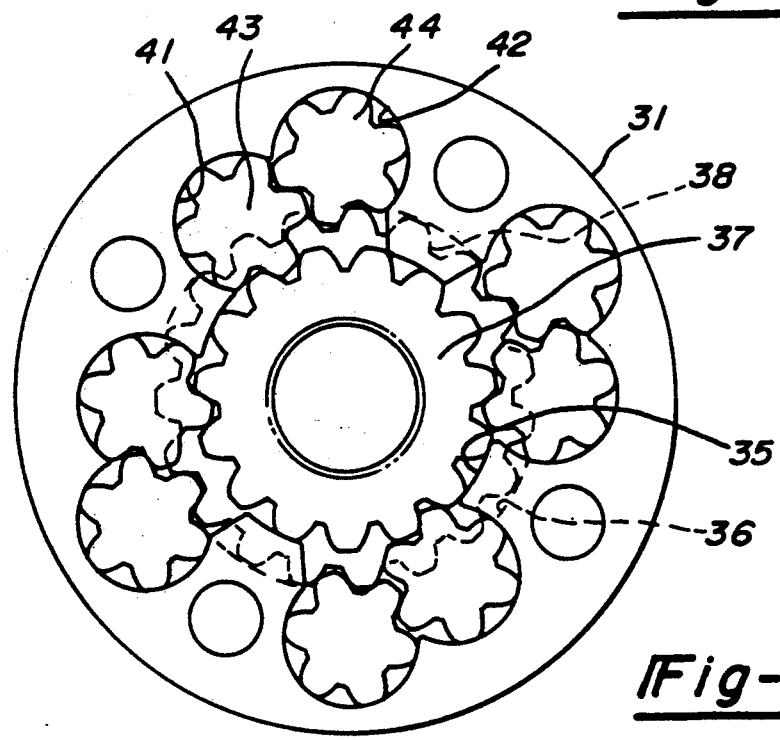
FIG. 3 is a sectional view of a differential of FIG. 2 along the line 3—3 thereof.

In FIGS. 2 and 3, the corresponding elements of FIGS. 1a and 1b are identified by the same reference numerals plus 30 (e.g. 1 would be 31). In this embodiment, the axle shaft gears 37, 38 are of different sizes, and according to this, the differential gears 43, 44 lie on different pitch circles. Also, the differential gears 43, 44 have different lengths so that their relative axial tooth engagement lies on the portion of the smaller axle shaft gear 37. An inner gear 34 drives the differential carrier 31 in place of a flange. A driven hollow shaft, which lies coaxial to the second axle shaft 40, can engage the gear 34. The axle shafts 39, 40 are shown in phantom. Only one mounting seat 32 is shown on the differential carrier. The second mounting takes place directly via the above mentioned drive shaft, which is not shown.

FIG. 3 illustrates evenly circumferentially distributed differential gears 43, 44 mounted in the pockets 41, 42. Also, gear 37 is shown in section while axle shaft gear 38 is shown in phantom. Both gears 37 and 38 are centralized and with clearance held in the housing bores 35, 36 according to the state of the art.

Figure 4:
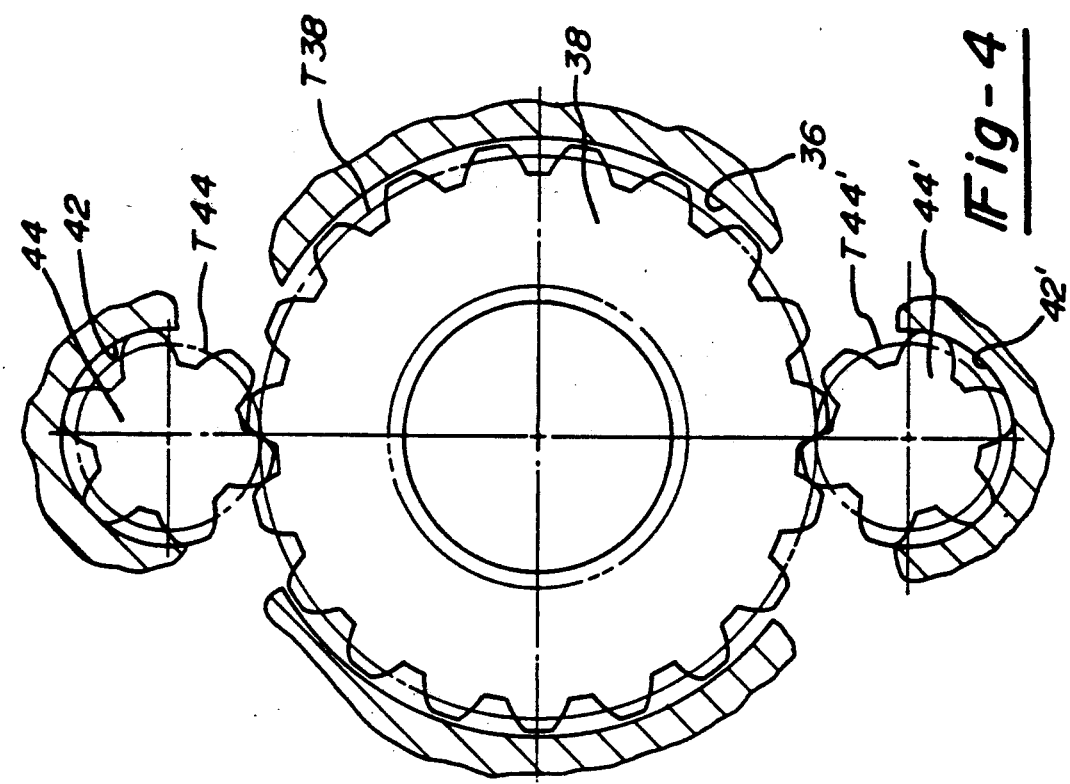
FIG. 4 is an enlarged view of FIG. 2 of a tooth arrangement along the diagonal I-K.

In FIG. 4, with reference to FIG. 3, a diagonal area is shown with two differential gears 44, 44' and the axle shaft gear 38 centrally held therebetween in its bore 36. Phantom lines show the pitch circle $T_{44}$, $T_{38}$ of the gears. The pitch lines roll away on each other. The differential gears are supported in essentially the direction of the diagonal I-K with the tooth heads in their bores or pockets 42, 42'.

Figure 5:
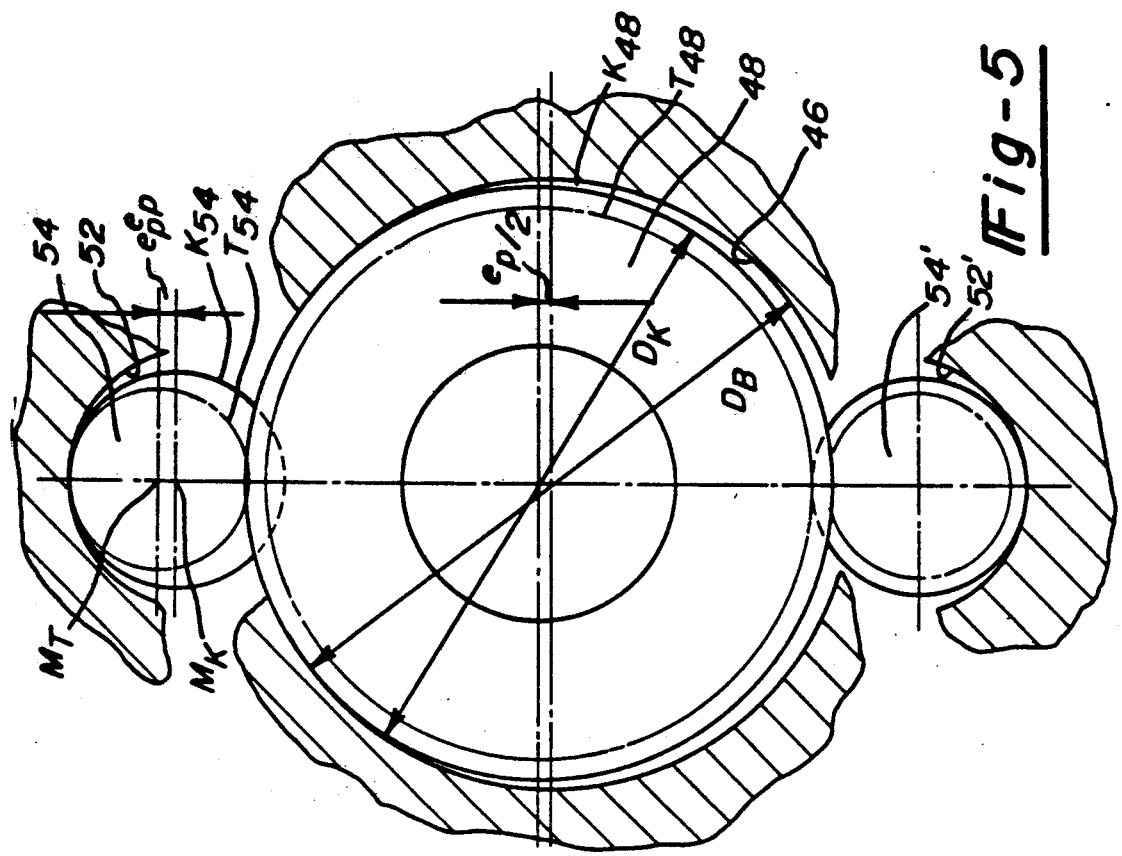
FIG. 5 is a schematic view like FIG. 4 of a gear arrangement in accordance with a first embodiment in an extreme position.

FIG. 5 is substantially similar to FIG. 4. The corresponding elements are identified by the same reference numerals plus 10. For simplification, instead of the gears with the tooth head, addendum circle K with its middle point $M_K$ is shown. On the differential gear 54, the middle point $M_T$ of the pitch circle $T_{57}$ is shifted across the addendum circle $K_{54}$ by an amount $e_P$. The axle shaft gear 48 corresponds entirely to the axle shaft gear 38. Likewise the differential gear 54' corresponds to the differential gear 44'. The diameter of the bore 46 is referenced with $D_B$ and the addendum circle diameter of the axle shaft gear 48 with $D_K$. In the extreme position shown in which the eccentricity $e_P$ lies in the axis I-K, the addendum circle $K_{48}$ in the bore 46 is established when the condition $(D_B - D_K) < e_P$ is fulfilled. The eccentric displacement of the axle shaft gear 48 then amounts to $e_P/2$.

Figure 6:
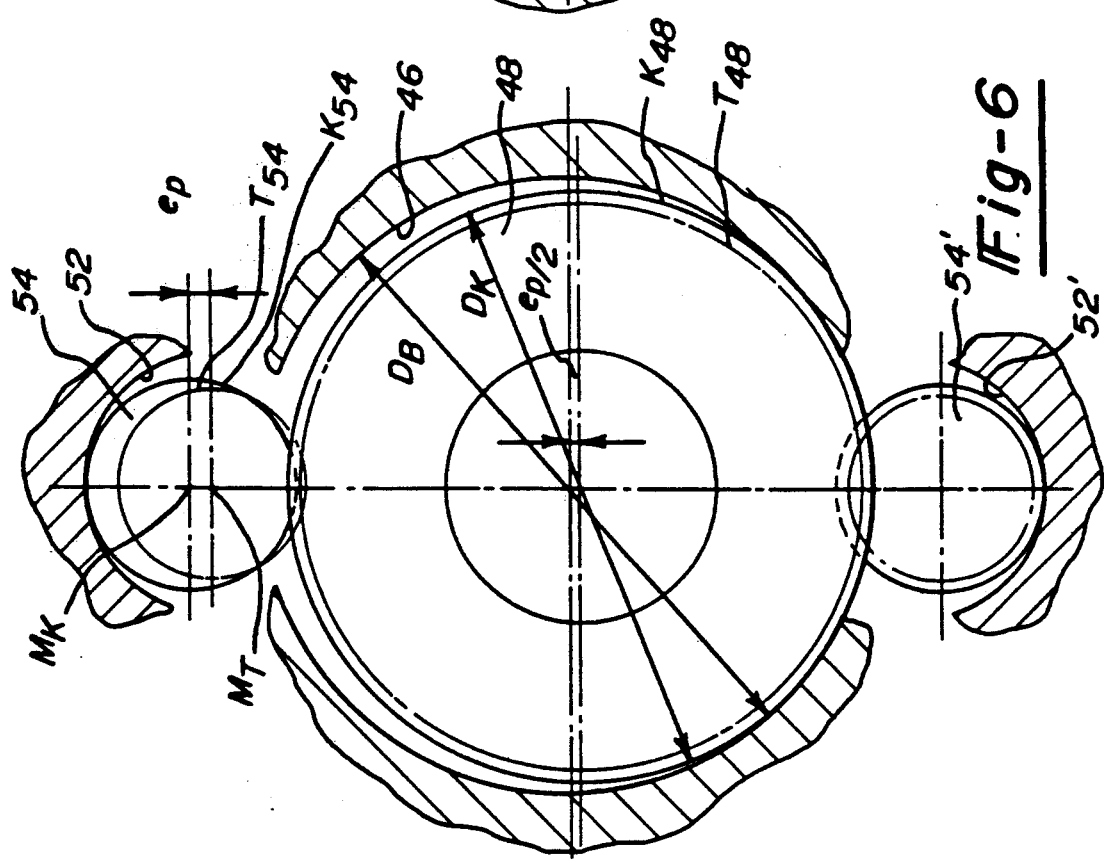
FIG. 6 is a schematic view like FIG. 5 of a gear in a second extreme position.

In FIG. 6 the same elements as in FIG. 5 will be identified by the same reference numerals. The eccentric deviation of the center point $M_T$ of the pitch circle $T_{54}$ in relation to the middle point M of the addendum circle $K_{54}$ again lies in the direction of the diagonal I-K. However, it is across the addendum circle center $M_K$ in the direction of the axle shaft gear 48. The establishment of the addendum circle $K_{48}$ of the axle shaft gear 48 in the bore 46 on the opposing side takes place likewise again under the conduit $(D_s - D_K) < e_P$. The eccentric displacement of the axle shaft gear 48 itself is thereby again $e_P/2$.

From FIGS. 5 and 6 it will be clear that with a rotation of the differential gear 54 in accordance with the embodiment of the invention, a double sliding contact of the axle shaft gear 48 in its bore 46 results.

Figure 7:
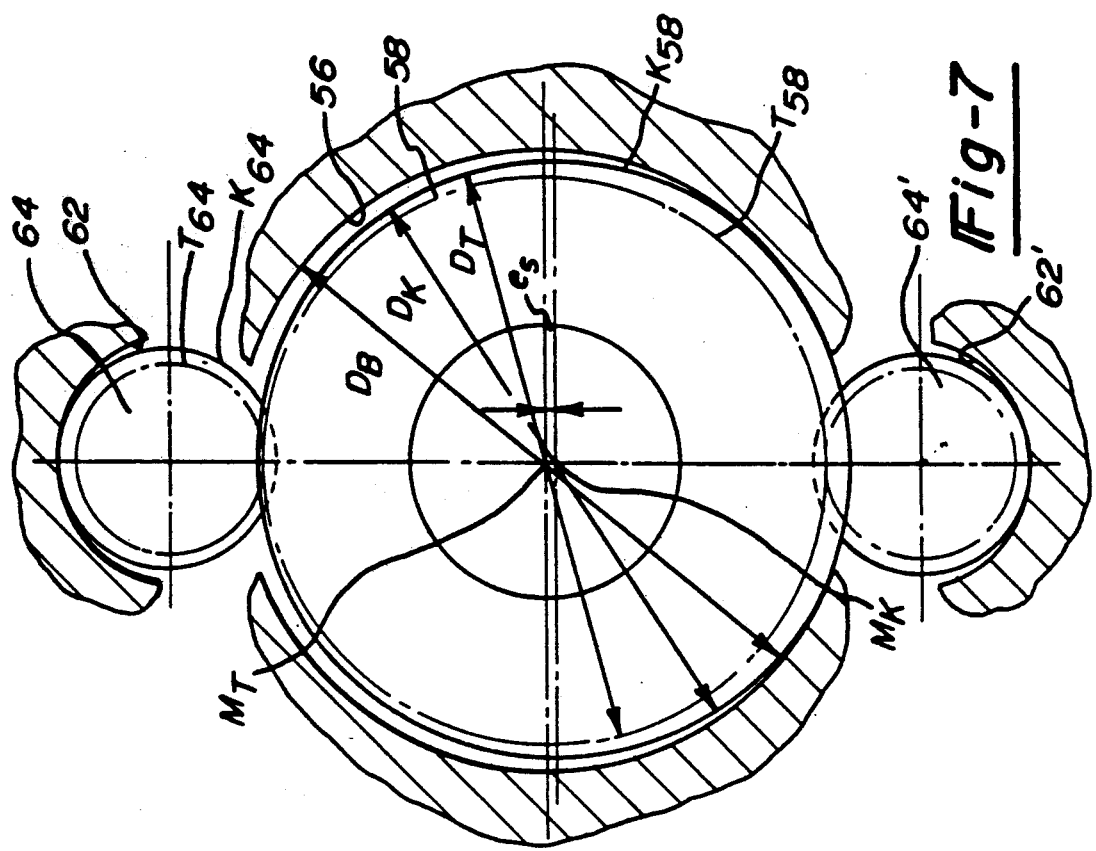
FIG. 7 is a schematic view like FIG. 4 of a gear arrangement in accordance with a second embodiment in an extreme position.

In FIG. 7, the corresponding elements described in FIGS. 5 and 6 will be identified by the same reference numerals plus 10. The differential gears 64 and 64' on the diagonal I-K are of conventional form. Thus, the gears 64, 64' pitch circle $T_{64}$ lies concentric to their addendum circle $K_{64}$. The axle shaft gear 58 is designed with its center $M_T$ of its pitch circle $T_{58}$ eccentrically displaced across the center $M_K$ of its addendum circle $K_{58}$. The eccentric shift is identified by $e_s$ and lies in the direction of the diagonal I-K. $D_K$ describes the diameter of the addendum circle, $D_T$ the diameter of the pitch circle and $D_B$ the diameter of the bore 56. A frictional contact of the addendum circle $K_{58}$ takes place with the bore or pocket 56 for the axle shaft gear 58 when the condition $(D_B - D_X) < 2e_s$ is met. This friction contact revolves with the rotational movement of the axle shaft gear 58 in the bore.

In FIG. 8 the corresponding elements with respect to FIG. 7 are identified with the same reference numerals plus 10. The embodiment of the differential gear 74 corresponds to the differential gear 54 of FIGS. 5 and 6. The eccentricity $e_P$ of the center $M_T$ of the pitch circle $T_{74}$ is mounted radially outwardly according to the position of FIG. 5 in the direction of the diagonal I-K across the center $M_K$ of the addendum circle $K_{74}$. The axle shaft gear 68 corresponds to the embodiment of FIG. 7 with eccentricity $e_s$ between the center of the addendum circle $K_{68}$ and the center of the pitch circle $T_{68}$. However, this is on the diagonal I-K, namely in counter direction to the differential gear 74. In the position shown, the addendum circle of the axle shaft gear 68 contacts its bore 66. The condition that establishes this arrangement is given as $(D_B-D_K)<e_p+2e_s$. The center of the addendum circle $K_{68}$ hereby revolves according to a cycloid so that during the rotation of the axle shaft gear the addendum circle $K_{68}$ comes more times in contact with the bore 66.

Figure 9:
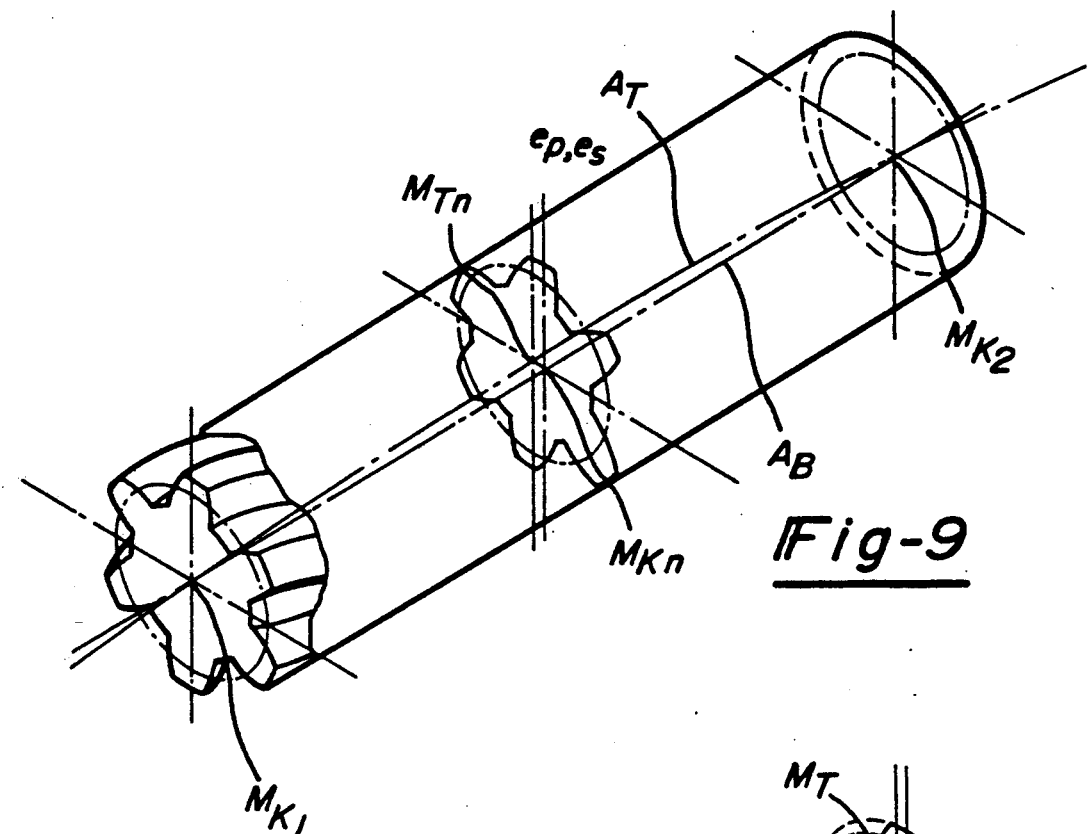
FIG. 9 is a partial perspective view of an axle gear or differential gear in accordance with the first embodiment of the present INVENTION.

FIG. 9 shows a tooth gear in accordance with the invention. The addendum circle center $M_{K1}$, $M_{K2}$ of the facing surfaces of the gear are connected through a straight reference line $A_B$. A curved axis $A_T$ deviates from this and connects the local pitch circle $M_{TN}$. At least in cross section of the gear an eccentric deviation $e_P$, $e_s$ must be provided between the local addendum circle center point $M_{KN}$ and the local pitch circle Center $M_{TN}$.

Figure 10:
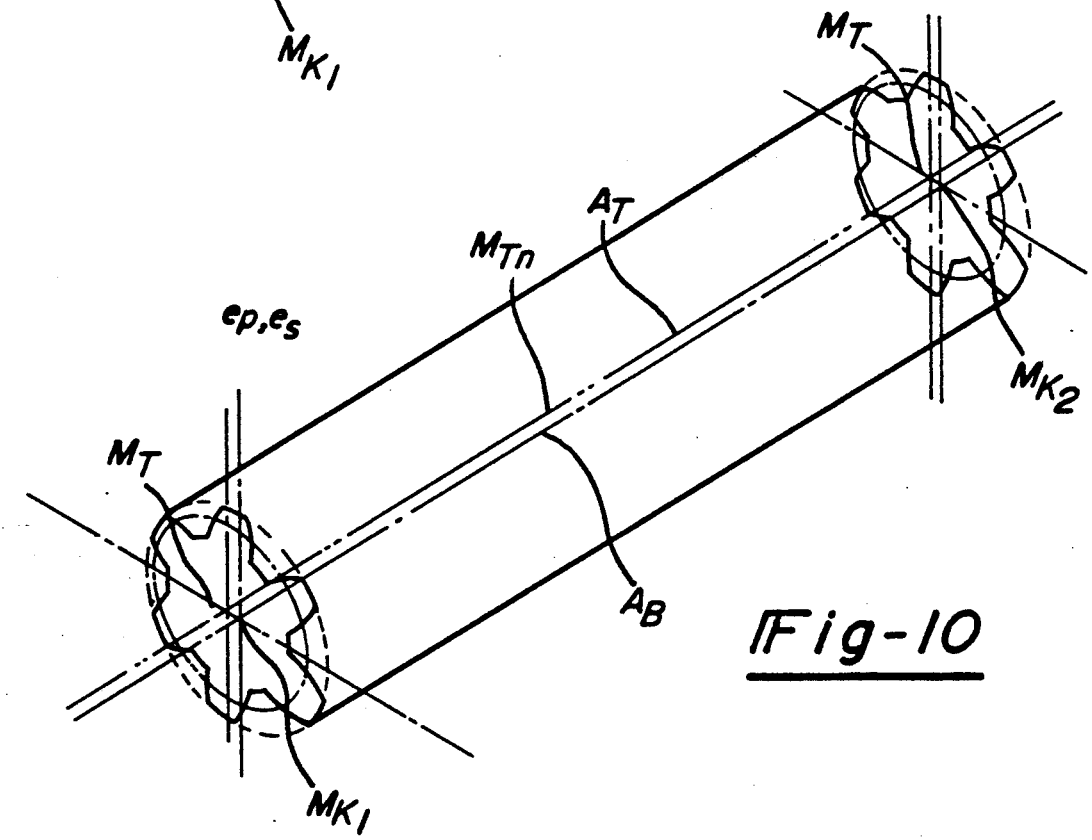
FIG. 10 is a schematic view of a differential gear or axle gear in accordance with a second embodiment of the present invention.

In FIG. 10 the same terms are used as in FIG. 9. Here the reference axis $A_B$ again runs through the addendum circle center point $M_{K1}$ and $M_{K2}$ and the axis $A_T$ with the local pitch circle center point $M_{TN}$ parallel thereto, so that the eccentric deviations $e_P$, $e_s$ are provided by the same size as on the facing surfaces of the gear in each preferred through the gear.

While the above detailed description describes the preferred embodiment of the present invention, the invention is susceptible to modification, variation, and alteration without deviating from the scope and fair meaning of the subjoined claims.

We claim:

1. A differential drive comprising:
   a differential carrier rotatably supported in a differential housing;
   two toothed axle shaft gears rotatably held in cylindrical bores in the differential carrier and coaxially arranged relative to each other;
   two groups of toothed differential gears supported in bores in the differential carrier, said differential gears each having a respective axis and being arranged such that said axes are substantially/parallel with one group of the differential gears engaging one of the axle shaft gears and another group engaging the other axle shaft gear, the one group of the differential gears engaging the other group of differential gears;
   at least one of the axle shaft gears or at least one of the therewith engaged differential gears, on at least part of a width of a tooth engagement between the axle shaft gear and the differential gear, having centers of local pitch circles of the teeth, which deviate radially from a straight connecting line between centers of two end addendum circle of the teeth, said gears and said bores being formed such that $$D_B - D_K < 2e_s + e_p,$$

where
   $D_B$ = a diameter of said axle shaft gear bore,
   $D_K$ = a diameter of said axle shaft gear addendum circle,
   $e_s$ = a maximal radial deviation of said axle shaft local pitch circle centers
   and $e_p$ = a maximal radial deviation of said differential gear local pitch circles.

2. A drive according to claim 1, wherein a line connecting the centers of the local pitch circles of the teeth of the axle shaft gears and differential gears having said radial deviation constitutes a curved line.

3. A drive according to claim 1, wherein a line connecting the centers of the local pitch circles of the teeth of the axle shaft gears and differential gears having said radial deviation extends parallel to a straight connecting line between centers of two end addendum circles of the teeth.

* * * * *

UNITED STATES PATENT AND TRADEMARK OFFICE
CERTIFICATE OF CORRECTION

PATENT NO. : 5,194,058

DATED : March 16, 1993

INVENTOR(S) : Peter Amborn et al

It is certified that error appears in the above-identified patent and that said Letters Patent is hereby corrected as shown below:

Column 3, line 16, "INVENTION" should be --Invention--.

Column 4, line 25, "ep;2" should be --ep/2--.

Column 4, line 35, "conduit" should be --condition that--

Column 4, line 35, "$D_s$" should be --$D_B$--

Column 4, line 56, "$D_X$" should be --$D_K$--.

Column 5, line 19, "Center" should be --center--.

Column 5, line 27, after "preferred", insert --cross section--.

Column 6, line 4, claim 1, after "substantially", delete "/".

UNITED STATES PATENT AND TRADEMARK OFFICE
CERTIFICATE OF CORRECTION

PATENT NO. : 5,194,058
DATED : March 16, 1993
INVENTOR(S) : Peter Amborn et al

It is certified that error appears in the above-indentified patent and that said Letters Patent is hereby corrected as shown below:

column 6, line 16, claim 1, "circle" should be --circles--.

Signed and Sealed this

First Day of March, 1994

Attest:

BRUCE LEHMAN

Attesting Officer

Commissioner of Patents and Trademarks